United States Patent Office 2,743,165
Patented Apr. 24, 1956

2,743,165
PRODUCTION OF ALKALI HYDROXIDES

George Miller, Barranquilla, Colombia, and
Frank Chase Godfrey, Boston, Mass.

Application August 15, 1950, Serial No. 179,574

9 Claims. (Cl. 23—184)

This invention relates to the manufacture of alkali metal hydroxides, for instance sodium hydroxide, and more particularly to the production of such alkali metal hydroxides in commercial grades and quantities by ion exchange. For a description of the background of the commercial production of alkali metal hydroxides particularly caustic soda and the need for cheaper methods of production reference is made to the copending application of Godfrey Serial No. 153,219, filed March 31, 1950, now abandoned.

One of the great advantages of the present invention is that the high concentrations which can be obtained in the end products of the present ion exchange process eliminates the necessity of evaporator equipment, boilers and the like for further concentration of the end product thereby substantially reducing the capital investment required for the commercial plant.

We have discovered that alkali metal hydroxides can be produced in concentrated form by ion exchange by using a concentrated hydroxide of either barium or strontium which, in turn may be produced as a precipitate and concentrated in solution by taking advantage of its property of variation of solubility with temperature.

In the following description the present invention is illustrated by preferred examples selected from any possibilities which the invention makes apparent and the scope of the claims is not intended to be limited to the examples contained in the description and in the schematic drawings more clearly illustrating the process of which:

GENERAL DESCRIPTION

Figure 1:
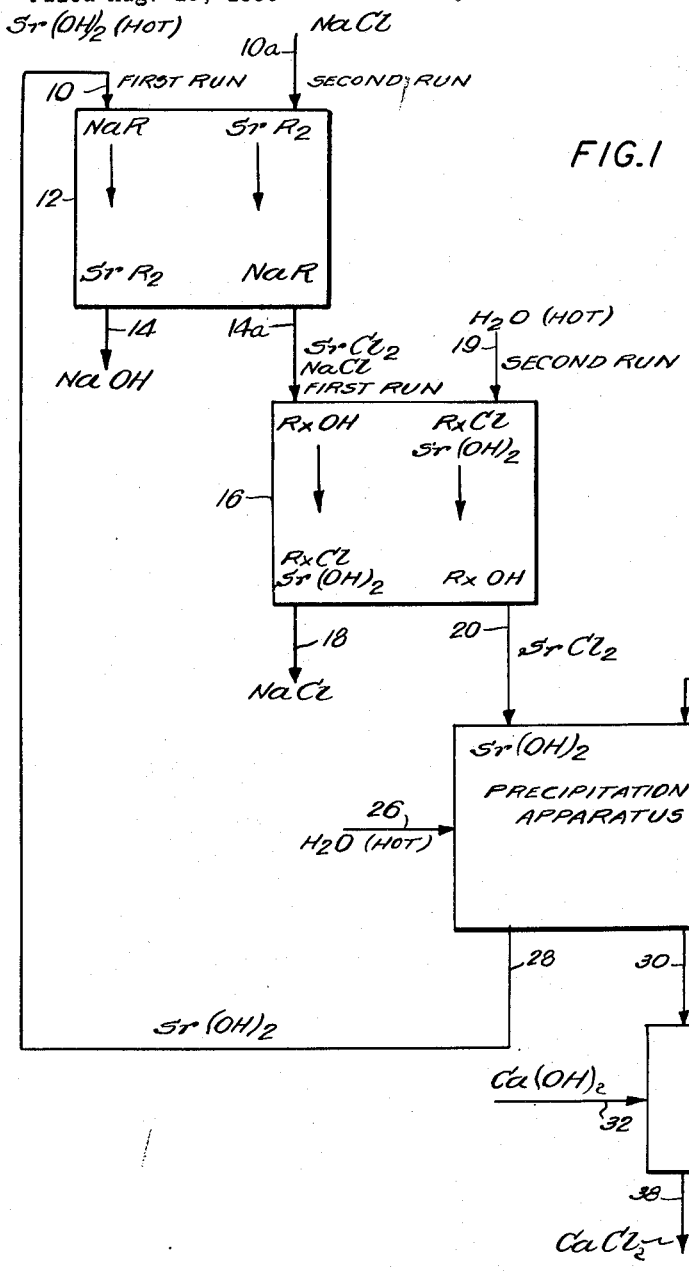
Fig. 1 is a schematic diagram of a one stage cation exchange process for concentrating sodium hydroxide according to the invention.

An ion is the smallest particle into which a substance in solution can be divided and still retain its identity and ionization or division into component positive ions or cations and negative ions or anions occurs when a composition is in solution. For each cation there is a corresponding anion thus, for instance, sodium hydroxide NaOH comprises molecules each formed with a positively charged sodium ion or cation Na+ and a negatively charged hydroxyl ion or anion OH−. In solution these ions have the property of being able to separate or disassociate and to associate themselves with other oppositely charged ions from or in another substance or composition present in or in contact with the solution. This process is ion exchange and the other substance exchanges a similarly charged ion in return for the ion which becomes associated with it, which may associate itself with an oppositely charged ion of the first composition. This process is analogous to the exchange of partners between two couples on a dance floor.

An ion exchanger is any composition or substance which is capable of exchanging one of its ions either cation or anion for one of the similarly charged ions of the composition and solution which is passed through and in contact with the ion exchanger for convenience called the exchanger.

An exchanger for the purposes of this invention is a mass or quantity of an insoluble or permanent material, usually in a granulated pea, saddle or other relatively divided form and lying in a batch or bed so arranged as in a tank that solutions can be passed through and in contact with it.

Generally speaking, any suitable cation exchangers may be used in the process of our invention which are capable of exchange between the form having the ion of the alkali metal of the salt from which the hydroxide is to be produced and the barium or strontium form.

The recently developed synthetic exchangers from which may be selected those best for the particular process involved according to readily available data are at present most satisfactory, for instance the sulphonated copolymers of phenol and formaldehyde and the like which are available on the market under the trade name "Amberlite" such as the cation exchangers "Amberlite IR-105," a sulphonic acid type, "Amberlite IRC-50" a carboxyl acid type and "Amberlite 120," a sulphonic acid type.

It will be understood that the ion exchangers, particularly the synthetic resin ion exchangers discussed are well known and that a suitable exchanger may be selected from among such readily available exchangers according to publicly available table data and their complicated chemical formulas and compositions for the most part need not be dealt with here. For our purposes the cation exchange materials may be designated by R. Throughout the process of this invention a resin cation exchanger will be in the form of a metallic resinate, for instance a strontium resinate $SrR_2$ which is interchangeable in form as the process of cation exchange takes place with for instance the sodium form NaR.

The invention can perhaps be best understood in general principle as follows:

If a strong solution of strontium hydroxide $Sr(OH)_2$ is passed through the sodium resinate NaR form of exchanger, the exchanger becomes strontium resinate $SrR_2$ and concentrated end product sodium hydroxide NaOH is produced as effluent in a first run through the exchanger. Then the strontium resinate $SrR_2$ form of exchanger may be regenerated back to the sodium form by passing in a second run a supply of sodium chloride NaCl through it, producing as exchanger effluent a mixture of strontium chloride $SrCl_2$ and sodium chloride NaCl. The supply of concentrated strontium hydroxide is produced by combining in any manner the strontium $Sr++$ ion from the strontium chloride exchanger effluent with a hydroxyl ion $OH-$ obtained from any suitable hydroxide. The strontium hydroxide may be produced in great quantity at low temperature whereby it is precipitated out as a solid and accumulated. Thereafter a small amount of water introduced to the solid precipitate solubilizes it at a high concentration as a supply for the first exchanger run. Thus the supply of strontium ions once established in the exchanger being recirculated is unexpended in the process.

As above mentioned strontium may be replaced by barium to form the precipitated hydroxide which is concentrated for use in the production run.

*Example 1.—One stage regeneration*

Fig. 1 illustrates the invention in a single stage regeneration process.

In the production or first run, concentrated solubilized strontium hydroxide $Sr(OH)_2$ is led through a line 10 and into an exchanger tank 12 containing the sodium NaR form of ion exchanger. The exchanger becomes strontium resinate $SrR_2$ and concentrated sodium hydroxide NaOH is produced as effluent end product through the line 14.

In a second run the strontium resinate form of exchanger is regenerated back to the sodium form by passing a supply of sodium chloride NaCl through the line 10A thereby producing as effluent to the line 14A a mixture of strontium chloride $SrCl_2$ and sodium chloride NaCl in solution.

The latter mixture is treated according to the process of our copending application Serial No. 177,886, filed August 5, 1950, by feeding it from the line 14A in a first run into an exchange apparatus 16 containing resin hydroxide RxOH form of anion exchanger. The exchanger reverts to a resin chloride form RxCl and strontium hydroxide $Sr(OH)_2$ is produced as a solid precipitate in the exchanger with waste sodium chloride NaCl as effluent through the line 18. A small amount of hot water $H_2O$ is then fed into the exchanger tank 16 through the line 19 dissolving the strontium hydroxide precipitate and regenerating the resin chloride exchanger back to the resin hydroxide form forming concentrated strontium chloride $SrCl_2$ as effluent through the line 20. The method of concentrating the strontium chloride as described is optional in the present invention other suitable methods being applicable. The strontium chloride from line 20 is combined with copper ammonium hydroxide $Cu(NH_3)_2(OH)_2$ from the line 24 to form a precipitate strontium hydroxide $Sr(OH)_2$ which is accumulated in apparatus 22. Then a small amount of hot water is introduced through the line 26 dissolving the precipitate into a highly concentrated solution as effluent in the line 28 from which it supplies the line 10 for the first run in the apparatus 12. When the strontium chloride and the copper ammonium hydroxide are reacted in the apparatus 22, copper ammonium chloride $Cu(NH_3)Cl_2$ is a reaction product in the line 30 from which it may be combined with calcium hydroxide CaOH from the line 32 in reaction apparatus 34 producing copper hydroxide $Cu(OH)_2$ and ammonia in the line 36 which is recirculated to the line 24.

The present example being merely illustrative the invention is intended to cover any means for precipitating the strontium hydroxide or equivalent barium hydroxide for use in the first run through line 10 in the exchange apparatus 12 of Fig. 1.

The equations for the above reactions are as follows:

(1) $Sr(OH)_2 + 2NaR \rightarrow SrR_2 + 2NaOH$
(2) Cold $SrCl_2 + NaCl + 2RxOH \rightarrow Sr(OH)_2 + 2RxCl + NaCl$
(3) Hot $Sr(OH)_2 + RxCl \rightarrow SrCl_2 + 2RxOH$
(4) $SrCl_2 + Cu(NH_3)_2(OH)_2 \rightarrow Sr(OH)_2 + Cu(NH_3)_2Cl_2$
(5) $Cu(NH_3)_2Cl_2 + Ca(OH)_2 \rightarrow Cu(OH)_2 + 2NH_3 + CaCl_2$
(6) $Cu(OH)_2 + 2NH_3 + Cu(NH_3)_2(OH)_2$

*Example 2.—Displacement of barium or strontium by a complexible metal electrolite*

Figure 2:
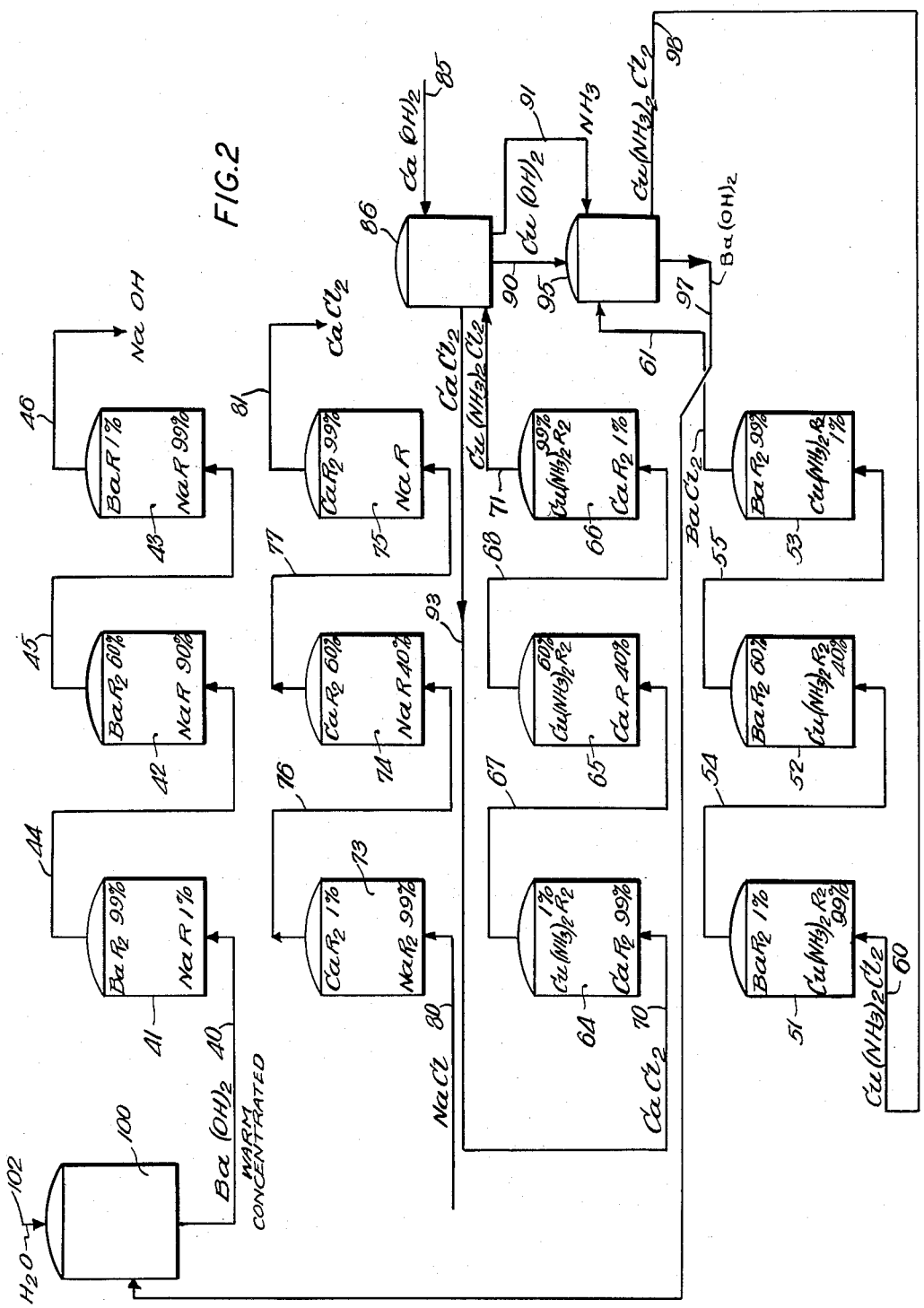
Fig. 2 is a schematic drawing of a three stage regeneration ion exchange process embodying the invention.

Fig. 2 illustrates an alternative process according to the invention embodying a production run and three regeneration runs including displacement of the barium or equivalent strontium ion with a complexible metal electrolite.

Concentrated barium hydroxide in solution is introduced from the line 40 to a series of exchanger tanks 41, 42 and 43 containing progressively exhausted sodium resinate NaR form of exchanger connected in series by the lines 44 and 45 thereby producing concentrated sodium hydroxide as end product effluent from the line 46.

As the exchanger batches from the production series represented by the tanks 41, 42 and 43 become exhausted to the barium form they are moved successively to a first regeneration stage represented by tanks 51, 52 and 53 connected in series by the lines 54 and 55 to which copper ammonium chloride $Cu(NH_3)_2Cl_2$ is introduced from the line 60 thereby reverting the exchanger to the copper ammonium resinate $Cu(NH_3)_2R_2$ form and producing barium chloride $BaCl_2$ as effluent in a line 61.

Tanks from the series 51–53 which became regenerated to the copper ammonium resinate form are moved successively to a second regeneration stage represented by tanks 64, 65 and 66 connected in series by lines 67 and 68. Calcium chloride $CaCl_2$ in line 70 is passed through the tanks 64–66 regenerating them to a calcium resinate $CaR_2$ form and producing copper ammonium chloride $Cu(NH_3)_2Cl_2$ in a line 71.

From the second stage of regeneration the tanks 64 to 66 are successively moved when regenerated to the calcium resinate form into a third stage of regeneration represented by the series of tanks 73, 74 and 75 connected in series by the lines 76, 77. Sodium chloride NaCl is introduced to the calcium resinate from the line 80 producing calcium chloride $CaCl_2$ as effluent from the line 81 and reverting the exchanger back to the sodium form NaR ready for the production run represented by the tanks 41, 42 and 43.

Thus, the displacement of the selected alkaline earth metal from the alkaline earth metal resinate ion exchanger and the regeneration of the ion exchanger to the original alkali metal resinate is carried out sequentially in a plurality of ion exchange runs which include passing through the exchanger an ionizable salt of a metal other than the said alkali earth metal to produce the effluent containing the ionizable salt of the selected alkaline earth metal and thereafter passing through the exchanger the ionizable salt of the desired alkali metal to regenerate the exchanger to the alkali metal resinate form for the production run.

The copper ammonium chloride in the line 71 is reacted in the usual manner with calcium hydroxide $Ca(CH)_2$ from a line 85 in reaction apparatus 86 to form copper hydroxide $Cu(OH_2)$ effluent in a line 90, free ammonia $NH_3$ in a line 91 and calcium chloride $CaCl_2$ in a line 93, the latter recirculating back into the calcium chloride supply line 70.

The copper hydroxide $Cu(OH)_2$ from the line 90, the free ammonia $NH_3$ in the line 91 and the barium chloride $BaCl_2$ in the line 61 are reacted in the usual manner in apparatus 95 to precipitate barium hydroxide $Ba(OH)_2$ in the line 97 and product copper ammonia chloride $Cu(NH_3)_2Cl_2$ in the line 98.

The barium hydroxide precipitate is carried in the line 97 to precipitation apparatus 100 where it is accumulated and then dissolved at a high concentration by the introduction of a small amount of hot water in the line 102 thereby forming a supply of concentrated barium hydroxide solution $Ba(OH)_2$ in the line 40 for the production run. The copper ammonium chloride in the line 98 is recirculated through the line 60 for the first regeneration stage.

Thus the raw materials are the sodium chloride in the line 80 and the inexpensive calcium hydroxide in the line 85. The process also furnishes a usable supply of calcium chloride in the line 81.

The equations for the above reactions are as follows:

EXCHANGER REACTIONS

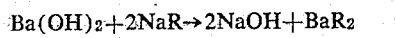

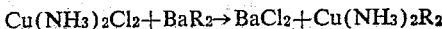

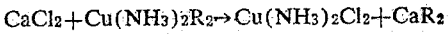

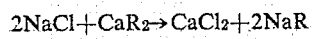

REACTIONS OUTSIDE EXCHANGER

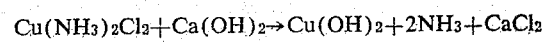

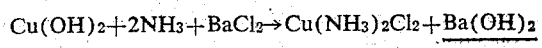

We claim:
1. A process of producing a concentrated solution of a hydroxide of an alkali metal from a solution containing an ionizable salt of said alkali metal comprising passing a concentrated solution of a hydroxide of an alkaline earth metal selected from the group consisting of barium and strontium through a cation exchanger in the form of a resinate of said alkali metal to convert said ion exchanger into the form of a resinate of said selected alkaline earth metal and to produce as a first effluent said concentrated alkali metal hydroxide solution; displacing said selected alkaline earth metal from said alkaline earth metal resinate to produce, as a second effluent, a solution containing an ionizable salt of said selected alkaline earth metal and regenerating said ion exchanger back to the form of said resinate of said alkali metal by passing through said resinate at least one solution which contains said ionizable salt of said alkali metal, contacting said second effluent with an ionizable hydroxide capable of reacting with said ionizable salt contained in said second effluent solution to produce a solution of the hydroxide of said selected alkaline earth metal, reducing the temperature of said last mentioned hydroxide solution produced thereby until said alkaline earth metal hydroxide is precipitated out of said solution, dissolving said precipitated alkaline earth metal hydroxide in a sufficient volume of water and at a sufficiently high temperature to produce said alkaline earth metal hydroxide in a concentrated solution and thereafter passing said concentrated solution through said regenerated resinate of said alkali metal.

2. The process of claim 1 wherein said displacement of said selected alkaline earth metal from said alkaline earth metal resinate ion exchanger and said regeneration of said ion exchanger are carried out sequentially in a plurality of ion exchange runs which include passing through said alkaline earth metal resinate ion exchanger a solution containing an ionizable salt of a metal other than said alkali metal to produce said second effluent thereby converting said exchanger to a resinate of said other metal, and passing through said last mentioned resinate a solution containing said ionizable salt of said alkali metal to produce said regenerated resinate exchanger.

3. The process of claim 1 wherein said selected alkaline earth metal is displaced from said alkaline earth metal ion exchanger to produce said second effluent, and said ion exchanger is also regenerated to said alkali metal resinate ion exchanger simultaneously, by passing said solution of said ionizable salt of said alkali metal through said alkaline earth metal resinate ion exchanger.

4. A process of producing a concentrated sodium hydroxide solution from a sodium chloride solution which comprises passing a concentrated solution of a hydroxide of an alkaline earth metal selected from the group consisting of barium and strontium through a sodium resinate ion exchanger producing as a first effluent said concentrated sodium hydroxide solution and converting said sodium resinate ion exchanger to a resinate of said selected alkaline earth metal; thereafter passing said solution of sodium chloride through said alkaline earth metal resinate to produce as a second effluent a chloride of said selected alkaline earth metal and to regenerate said alkaline earth metal resinate into said alkali metal resinate, contacting said second effluent with an ionizable hydroxide capable of reacting with said alkaline earth metal chloride contained in said second effluent solution to produce a solution of said alkaline earth metal hydroxide, reducing the temperature of said last mentioned hydroxide solution formed thereby until said alkaline earth metal hydroxide is precipitated out of said solution, dissolving said precipitated hydroxide in a sufficient volume of water and at a sufficiently high temperature to produce said alkaline earth metal hydroxide in a concentrated solution and thereafter passing said concentrated solution through said regenerated resinate of said alkali metal.

5. The process of claim 4 wherein said ionizable hydroxide comprises a metal ammonium hydroxide.

6. The process of claim 4 wherein said ionizable hydroxide comprises a copper ammonium hydroxide.

7. The process of producing a concentrated sodium hydroxide solution from a sodium chloride solution which comprises passing a concentrated solution of a hydroxide of an alkaline earth metal selected from the group consisting of barium and strontium through a sodium resinate ion exchanger and producing, as a first effluent, said concentrated sodium hydroxide solution and converting said sodium resinate into a resinate of said selected alkaline earth metal, passing through said alkaline earth metal resinate ion exchanger a solution containing an ionizable chloride salt of a metal other than sodium to produce as a second effluent a solution of a chloride of said selected alkaline earth metal and thereby converting said exchanger to a resinate of said other metal, passing through said converted resinate exchanger a solution containing calcium chloride to convert said exchanger to a calcium resinate, and passing through said calcium resinate a solution containing said sodium chloride to regenerate said exchanger to a sodium resinate, contacting said second effluent with an ionizable hydroxide capable of reacting with said chloride of said selected alkaline earth metal contained in said second effluent solution to produce a solution of the hydroxide of said selected alkaline earth metal, reducing the temperature of said last mentioned hydroxide solution produced thereby until said alkaline earth metal hydroxide is precipitated out of said solution, dissolving said precipitated alkaline earth metal hydroxide in a sufficient volume of water and at a sufficiently high temperature to produce said alkaline earth metal hydroxide in a concentrated solution and thereafter passing said concentrated solution through said regenerated sodium resinate exchanger.

8. The process of claim 7 wherein said solution containing said ionizable chloride salt of said metal other than sodium comprises a metal ammonium chloride solution, said resulting resinate is a metal ammonium resinate and said ionizable hydroxide comprises a metal ammonium hydroxide.

9. The process of claim 8 wherein said metal ammonium chloride, said metal ammonium resinate and said metal ammonium hydroxide comprises respectively copper ammonium chloride, copper ammonium resinate and copper ammonium hydroxide.

References Cited in the file of this patent

UNITED STATES PATENTS

| | | |
|---|---|---|
| 720,927 | Jacobs | Feb. 17, 1903 |
| 960,887 | Gans | June 7, 1910 |
| 974,993 | Rollins | Nov. 8, 1910 |
| 1,799,989 | Rusberg | Apr. 7, 1931 |
| 2,409,861 | Hunter et al. | Oct. 22, 1946 |
| 2,606,098 | Bauman | Aug. 5, 1952 |

OTHER REFERENCES

Kumin and Myers "Ion Exchange Resins," 1950 Ed., pages 31, 32, 76–82, 89. John Wiley & Sons, Inc., N. Y.